(12) United States Patent
Warner et al.

(10) Patent No.: US 12,504,594 B2
(45) Date of Patent: Dec. 23, 2025

(54) OLTS INTEROPERABLE WITH DIFFERENT ONTS

(71) Applicant: ARRIS Enterprises LLC, Suwanee, GA (US)

(72) Inventors: Shawn W. Warner, Pepperell, MA (US); Bruce C. Pratt, Bedford, NH (US); David Bowler, Stow, MA (US)

(73) Assignee: ARRIS Enterprises LLC, Horsham, PA (US)

( * ) Notice: Subject to any disclaimer, the term of this patent is extended or adjusted under 35 U.S.C. 154(b) by 286 days.

(21) Appl. No.: 18/202,669

(22) Filed: May 26, 2023

(65) Prior Publication Data

US 2024/0053557 A1    Feb. 15, 2024

Related U.S. Application Data

(60) Provisional application No. 63/397,735, filed on Aug. 12, 2022.

(51) Int. Cl.
| | | |
|---|---|---|
| *G02B 6/38* | (2006.01) | |
| *G02B 6/43* | (2006.01) | |
| *H04J 14/02* | (2006.01) | |
| *H05K 1/02* | (2006.01) | |

(52) U.S. Cl.
CPC .............. *G02B 6/43* (2013.01); *G02B 6/3897* (2013.01); *H04J 14/0282* (2013.01); *H05K 1/0274* (2013.01)

(58) Field of Classification Search
CPC .......................... G02B 6/3897; H04J 14/0282
See application file for complete search history.

(56) References Cited

U.S. PATENT DOCUMENTS

| | | |
|---|---|---|
| 2013/0315594 A1 | 11/2013 | Liang et al. |
| 2019/0319709 A1 | 10/2019 | Zheng et al. |

FOREIGN PATENT DOCUMENTS

| | | |
|---|---|---|
| EP | 3952324 A1 | 2/2022 |
| EP | 4030776 A1 | 7/2022 |
| WO | 2017177619 A1 | 10/2017 |

OTHER PUBLICATIONS

International Search Report and Written Opinion RE: Application No. PCT/US2023/023716, dated Sep. 19, 2023.
Carey Tim et al: "TR-451 vOMCI Specification", Jun. 1, 2022, pp. 1-113, XP093005109, Retrieved from the Internet: URL: https://www.broadband-forum.org/technical/download/TR-451.pdf [retrieved on Dec. 5, 2022] paragraph [01.1]-paragraph [5.8.4.5] paragraph [ANNEXA] paragraph [APPENDIXIII].
Carey Tim et al: "TR-451 vOMCI Specification", Jun. 1, 2022, pp. 1-113, XP093005109 Retrieved from the Internet: URL:https://www.broadband-forum.org/technical/download.TR-451.pdf [retrieved on Dec. 5, 2022].

*Primary Examiner* — Sung H Pak
(74) *Attorney, Agent, or Firm* — Chernoff, Vilhauer, McClung & Stenzel, LLP (57) ABSTRACT

A system with OLTs having a meshed interconnection.

6 Claims, 6 Drawing Sheets

OLTS INTEROPERABLE WITH DIFFERENT ONTS

CROSS REFERENCE TO RELATED APPLICATIONS

This application claims the benefit of U.S. Provisional Patent Application Ser. No. 63/397,735 filed Aug. 12, 2022.

BACKGROUND

The subject matter of this application relates to OLTs having a meshed interconnection.

A passive optical network (PON) is often employed as an access network, or a portion of a larger communication network. The communication network typically has a high-capacity core portion where data or other information associated with telephone calls, digital television, and Internet communications is carried substantial distances. The core portion may have the capability to interact with other networks to complete the transmission of telephone calls, digital television, and Internet communications. In this manner, the core portion in combination with the passive optical network enables communications to and communications from subscribers (or otherwise devices associated with a subscriber, customer, business, or otherwise).

The access network of the communication network extends from the core portion of the network to individual subscribers, such as those associated with a particular residence location (e.g., business location). The access network may be wireless access, such as a cellular network, or a fixed access, such as a passive optical network or a cable network.

Figure 1:
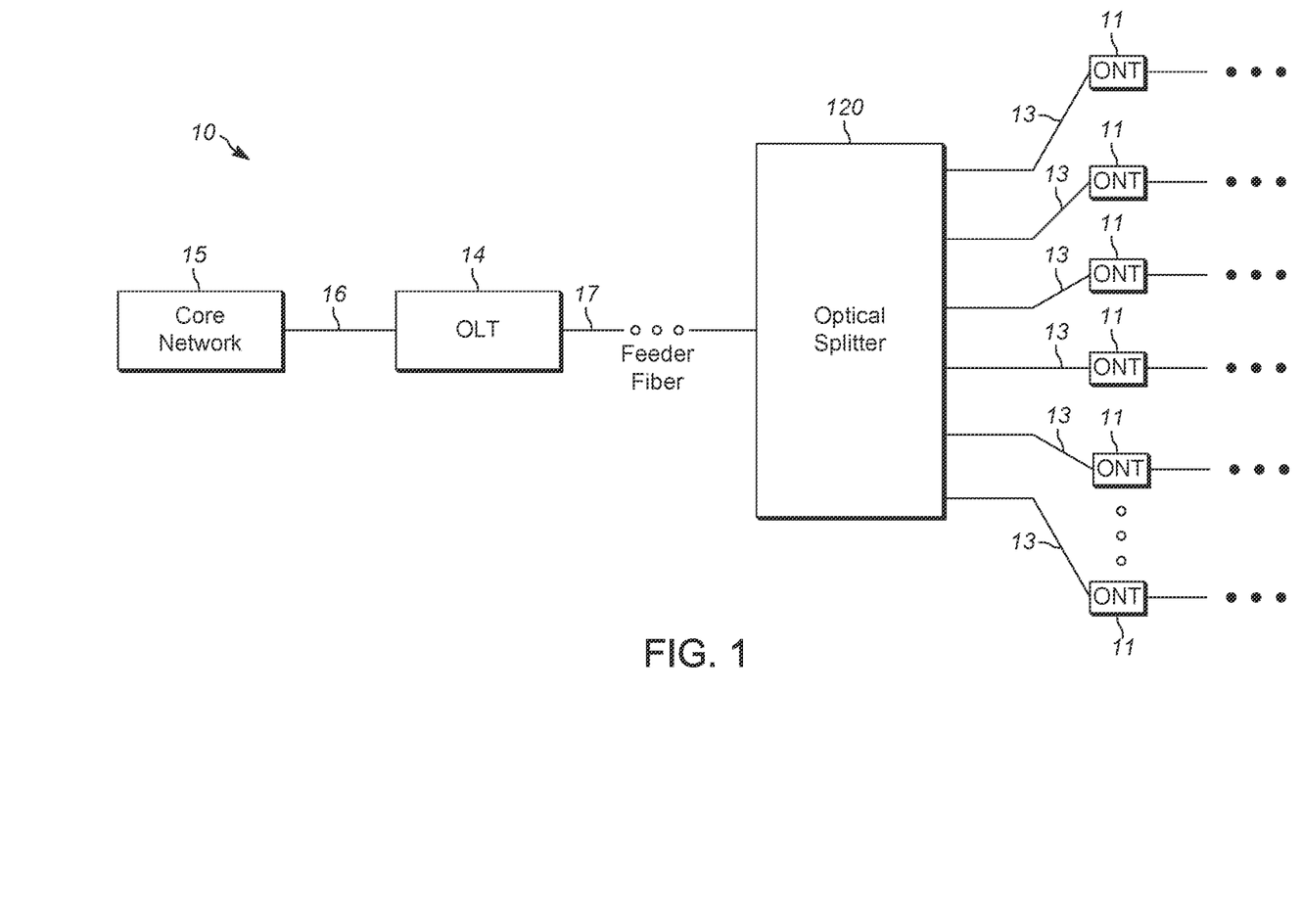
FIG. 1 illustrates a network that includes a passive optical network.

Referring to FIG. 1, in a PON 10, a set of optical fibers and passive interconnecting devices are used for most or all of the communications through the extent of the access network. A set of one or more optical network terminals (ONTs) 11 are devices that are typically positioned at a subscriber's residence location (e.g., or business location). The term "ONT" includes what is also referred to as an optical network unit (ONU). There may be any number of ONTs associated with a single optical splitter 12. By way of example, 32 or 64 ONTs are often associated with the single network optical splitter 12. The optical splitter 12 is interconnected with the respective ONTs 11 by a respective optical fiber 13, or otherwise a respective fiber within an optical fiber cable. Selected ONTs may be removed and/or added to the access network associated with the optical splitter 12, as desired. There may be multiple optical splitters 12 that are arranged in a cascaded arrangement.

The optical fibers 13 interconnecting the optical splitter 12 and the ONTs 11 act as access (or "drop") fibers. The optical splitter 12 is typically located in a street cabinet or other structure where one or more optical splitters 12 are located, each of which are serving their respective set of ONTs. In some cases, an ONT may service a plurality of subscribers, such as those within a multiple dwelling unit (e.g., apartment building). In this manner, the PON may be considered a point to multipoint topology in which a single optical fiber serves multiple endpoints by using passive fiber optic splitters to divide the fiber bandwidth among the endpoints.

An optical line terminal (OLT) 14 is located at the central office where it interfaces directly or indirectly with a core network 15. An interface 16 between the OLT 14 and the core network 15 may be one or more optical fibers, or any other type of communication medium. The OLT 14 forms optical signals for transmission downstream to the ONTs 11 through a feeder optical fiber 17, and receives optical signals from the ONTs 11 through the feeder optical fiber 17. The optical splitter 12 is typically a passive device that distributes the signal received from the OLT 14 to the ONTs 11. Similarly, the optical splitter 12 receives optical signals from the ONTs 11 and provides the optical signals though the feeder optical fiber 17 to the OLT 14. In this manner, the PON includes an OLT with a plurality of ONTs, which reduces the amount of fiber necessary as compared with a point-to-point architecture.

As it may be observed, an optical signal is provided to the feeder fiber 17 that includes all of the data for the ONTs 11. Accordingly, all the data being provided to each of the ONTs is provided to all the ONTs through the optical splitter 12. Each of the ONTs selects the portions of the received optical signals that are intended for that particular ONT and passes the data along to the subscriber, while discarding the remaining data. Typically, the data to the ONTs are broadcast to the feeder fiber 17 and provided to each of the ONTs.

Upstream transmissions from the ONTs 11 through the respective optical fibers 13 are typically transmitted in bursts according to a schedule provided to each ONT by the OLT. In this way, each of the ONTs 11 will transmit upstream optical data at different times. In some embodiments, the upstream and downstream transmissions are transmitted using different wavelengths of light so that they do not interfere with one another. In this manner, the PON may take advantage of wavelength-division multiplexing, using one wavelength for downstream traffic and another wavelength for upstream traffic on a single mode fiber.

The schedule from the OLT allocates upstream bandwidth to the ONTs. Since the optical distribution network is shared, the ONT upstream transmission would likely collide if they were transmitted at random times. The ONTs typically lie at varying distances from the OLT and/or the optical splitter, resulting in a different transmission delay from each ONT. The OLT measures the delay and sets a register in each ONT to equalize its delay with respect to the other ONTs associated with the OLT. Once the delays have been accounted for, the OLT transmits so-called grants in the form of grant maps to the individual ONTs. A grant map is a permission to use a defined interval of time for upstream transmission. The grant map is dynamically recalculated periodically, such as for each frame. The grant map allocates bandwidth to all the ONTs, such that each ONT receives timely bandwidth allocation for its service needs. Much of the data traffic, such as browsing websites, tends to have bursts and tends to be highly variable over time. By way of a dynamic bandwidth allocation (DBA) among the different ONTs, a PON can be oversubscribed for upstream traffic.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 2:
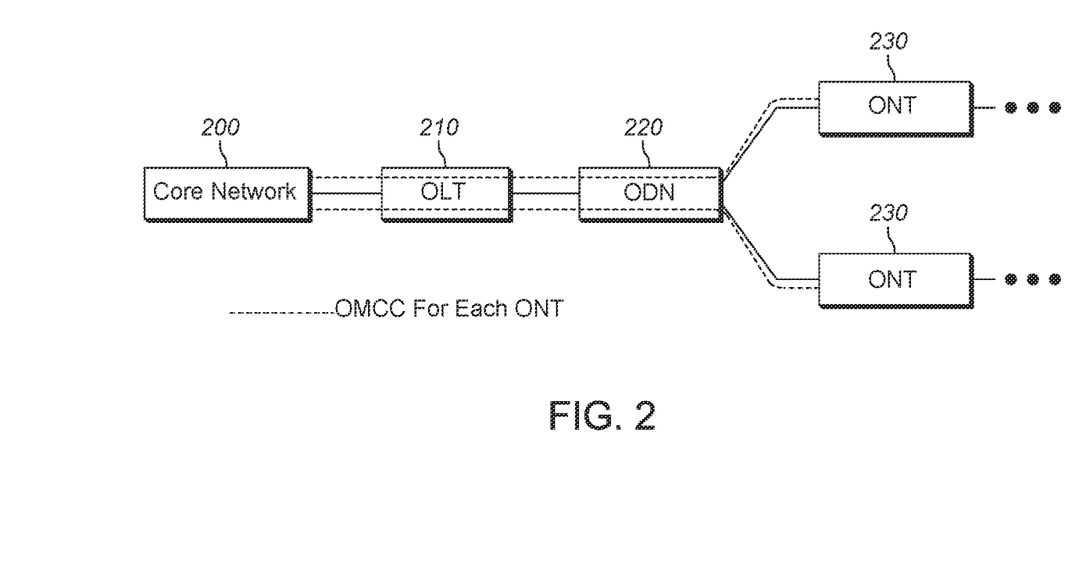
FIG. 2 illustrates OMCC messages provided to and from ONTs in a passive optical network.

Referring to FIG. 2, the core network and/or the optical line terminals provides management and control functionality over the ONT by using an optical network unit management and control interface (OMCI). The core network 200 and the OLT 210 with which it provides data to and receives data from, transmits data and receives data using a PON protocol over an optical distribution network (e.g., optical splitters, etc.) 220. The OLT 210 passes data through the optical distribution network (ODN) 220 to the ONTs 230, and receives data through the optical distribution network (ODN) 220 from the ONTs 230. The OMCI messages between the ONT 210 and the ONTs 230 for management and control are likewise provided between the OLT 210 and the ONTs 230 through the ODN 22. The ONTs 230 provides access network line termination, a user network interface line termination for subscriber devices, and service multiplexing and de-multiplexing for subscriber devices.

The configuration management provides functions to identify the ONTs capabilities and to exercise control over the ONTs. The areas of management for the ONTs include configuration of, (1) equipment, (2) passive optical network and reach extender protection, (3) the user network interfaces, (4) Gigabit-capable passive optical network Encapsulation Method port network contention termination points; (5) interworking termination points; (6) operations, administration, and maintenance flows, (7) physical ports, (8) Gigabit-capable passive optical network Encapsulation Method adaptation layer profiles, (9) service profiles, (10) traffic descriptors, and (11) asynchronous transfer mode adaptation layer profiles. As modelled by the OMCI, the ONT detects and reports equipment, software, and interface failures and declares the corresponding alarms. The ONTs may be considered as managed entities by the exchange of information between the OLT and the ONT, based upon the OMCI messages for optical access networks.

Each of the functions related to the ONTs capabilities and management are described, to a greater or lesser extent, by various standards in a terse manner that are, typically arrived at by consensus of a diverse set of entities, each of which tends to have a different viewpoint on the meanings of the description in the standards. Accordingly, each of the ONTs and especially those developed by different manufacturers, may have variations based upon the particular manufacturer's interpretation of the various standards. This tends to be especially true for the control and management functions.

The G.988 standard describes managed entities of a protocol-independent management information base (MIB) that models the exchange of information between OLT and ONT in a PON-based access network that are subject to a standard, such as for example, G.988. See, G.988: ONU management and control interface (OMCI) specification, (11/17); G.988 (2017) Amendment 1 (11/18); G.988 ((2017) Amendment 2 (08/19); G.988 (2017) Amendment 3 (03/2); and G.988 (2017) Amendment 4 (09/21), each of which is incorporated by reference herein in its entirety. G.988 also addresses the ONT management and control channel (OMCC) setup, protocol, and message formats. In addition to interpretation considerations by various manufacturers of the G.988 standard, it is also not often sufficient for complete interoperability between different OLT and ONT manufacturers. The G.988 standard further fails to define high-scale sequencing of action in provisioning of complex services. Further, the G.988 standard is not adapted to accommodate multichannel PON systems, and is not extended to fully address the features and requirements of multichannel PON systems. Also, there exist various ONTs that are simply not compliant with the various standards because of manufacturer decisions on their implementation.

Figure 3:
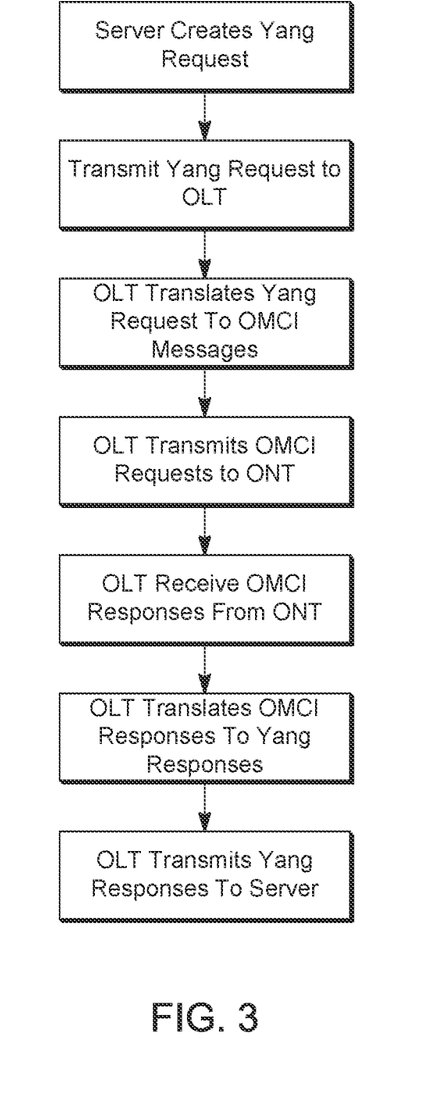
FIG. 3 illustrates an exemplary process flow for OMCI messages to manage ONTs in a passive optical network.

Referring to FIG. 3, one technique to provide an OMCI message to the ONT is for a server at the core network (i.e., any server within the network), to create a virtual OMCI set of microservices that are especially tailored to the functionality for each ONT model of each vendor. The management data maintained by the system is typically defined in terms of YANG data models that comprise modules and submodules that define configuration and state data, notifications, and remote procedure calls for. A YANG module defines a data model through its data, and the hierarchical organization of and constraints on that data. Each module is uniquely identified by a namespace URI. A module defines a single data model. However, a module can reference definitions in other modules and submodules by using the import statement to import external modules or the include statement to include one or more submodules. Additionally, a module can augment another data model by using the augment statement to define the placement of the new nodes in the data model hierarchy and a when statement to define the conditions under which the new nodes are valid. A module uses a feature statement to specify parts of a module that are conditional and the deviation statement to specify where the device's implementation might deviate from the original definition. In this manner, a module can have a large complex set of conditions that accommodate various environments. The core network provides the YANG requests to the OLT which then translates the YANG requests and responses and notifications to and from a vOLTMF (vOLT Management Function) into the OMCI messages, and the OLT transmits and receives the OMCI message requests and responses and notifications to and from the ONT.

Figure 4:
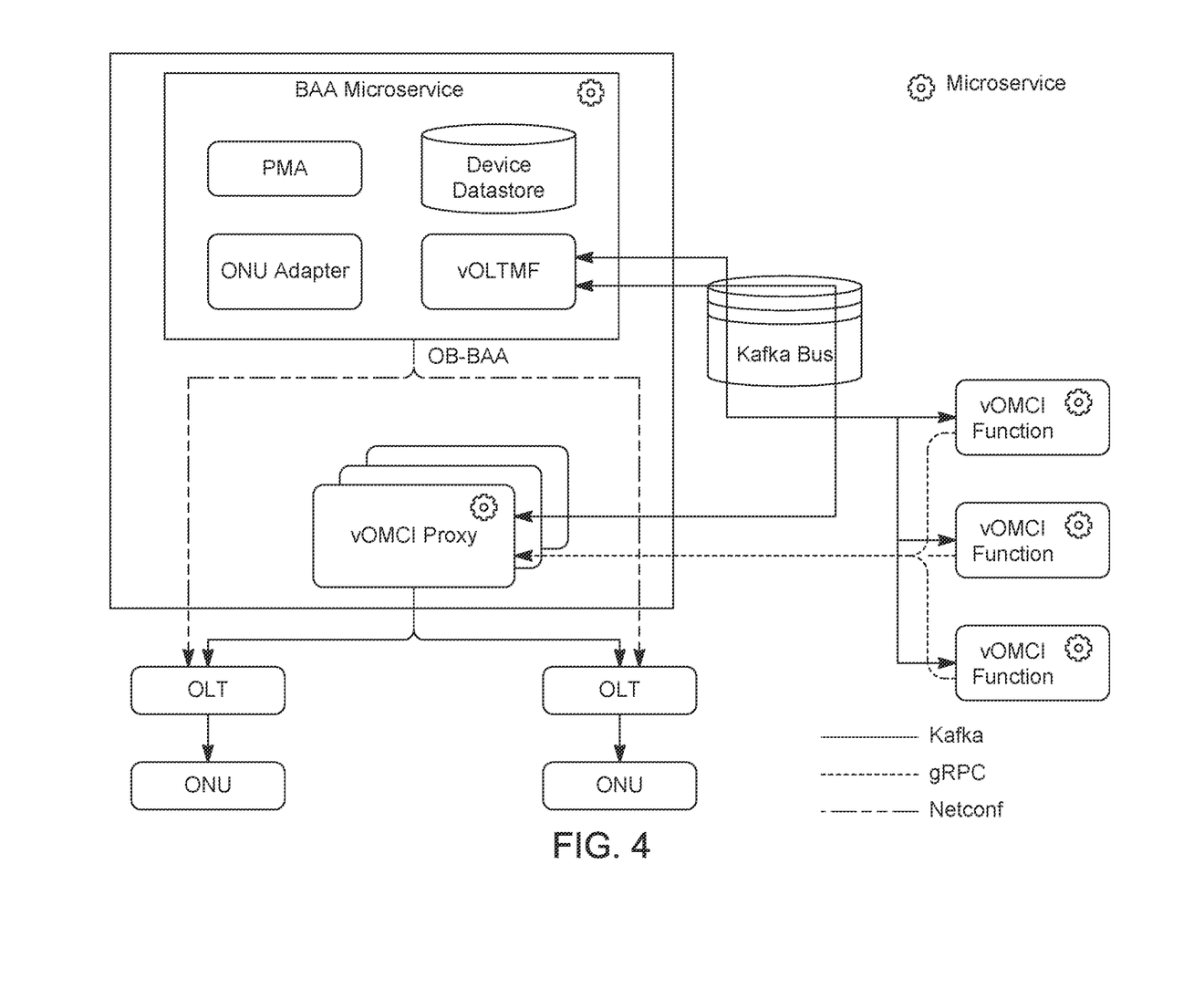
FIG. 4 illustrates a vOLT Management Function to manage ONTs though vOMCI messages in a passive optical network.

Referring to FIG. 4, a high-level design of the vOLT Management Function (vOLTMF) that may be used to manage ONTs through the vOMCI messages is illustrated. There is communication between the vOLTMF, vOMCI Proxy, and vOMCI function based upon creating and deleting ONTs, receiving ont-state-change notifications, and sending requests to ONTs. The vOLTMF manages ONTs through a ONT adapter that may be deployed as broadband access abstraction, the association of which is based on the model, type, vendor, and version mentioned while creating the ONT. The ONT adapter may use a library of the YANG modules for ONTs that the vOLTMF refers to for handling ONT requests, responses, and notifications from external management systems.

The vOLTMF performs actions upon receiving notifications and requests either from an OLT device or other components within the broadband access abstraction core. For example, the onu-state-change notification that is sent by the OLT device on its Northbound Interface (NBI) that is received by broadband access abstraction core. The broadband access abstraction core propagates the notification towards vOLTMF and broadband access abstraction NBI so that it can be handled by the Access SDN M&C.

Upon reception of the notification, the vOLTMF processes the notification, checks if a preconfigured ONT device exists and authenticates the ONT, the vOLTMF transforms the notification to Google Protobufs (GPB) format and propagates the set-onu-communication Action towards the vOMCI function and vOMCI-proxy via the Kafka bus.

All the YANG requests are sent towards the vOMCI function and vOMCI Proxy via the Kafka bus in GPB format. Once the vOMCI function/Proxy processes the requests, the vOMCI function sends the notification/request response in GPB format back to the vOLTMF via the Kafka bus and the response is received through the KafkaNotificationCallback #onNotification( ).

Upon receiving the response, the vOLTMF is responsible for processing the response and performs actions accordingly.

There could be multiple interactions between the vOLTMF and the vOMCI function including parallel configuration requests/commands for either the same or different ONTs. These interactions are parallel and asynchronous such that the requests are not idle/blocked while waiting for responses because the vOLTMF has separate task queues and threadpools to handle the request/response interactions. The following shows the list of vOLTMF threadpools that spawned as new Runnable tasks, namely, processNotificationRequestPool, kafkaCommunicationPool, kafkaPollingPool, processNotificationResponsePool, and processRequestResponsePool. processNotificationRequestPool is used for processing the mediated device event listener callbacks and device notification requests. kafkaCommunicationPool is used to process individual GET/COPY-CONFIG/EDIT-CONFIG requests inside a MediatedDeviceNetconfSession spawned by processRequestResponsePool. kafkaPollingPool is used to tart up the KafkaConsumer implementation and polling for responses from vOMCI-function/vOMCI Proxy. processRequestResponsePool is used for processing notification responses from the vOMCI-function/vOMCI Proxy. The processRequestResponsePool is used for processing GET/COPY-CONFIG/EDIT-CONFIG requests and responses from the vOMCI-function/vOMCI Proxy. In general, the process may be considered a type of protocol adapter to one that operates on an ONT that also works with an OLT in a PON environment. As it may be observed, the manner in which the processing is performed is relatively complex, including Google Protobufs, remote procedure calls, and other complications that require a substantial amount of computational resources to process all the microservices which are burdensome for the OLT.

Figure 5:
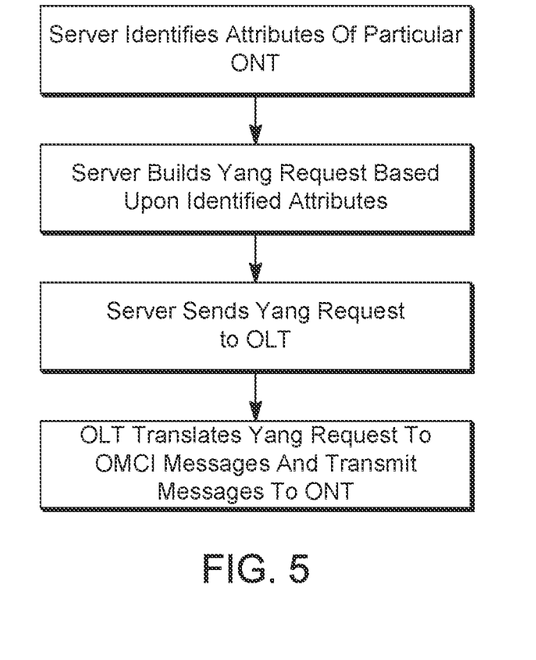
FIG. 5 illustrates an exemplary YANG model selection.

Referring to FIG. 5, with the determination that the ONTs are not consistent in their intended functionality, the server builds or otherwise selects a particular YANG request for the particular ONT, based upon an identification of the nature of the particular ONT. For example, this identification may be based upon a device ID, a vendor-specific product code attribute, and/or a vendor ID attribute, which may be obtained from the ONT or otherwise maintained in a database. The server then provides the particular YANG request to the OLT which translates the YANG request to OMCI messages and transmits such OMCI messages to the ONT. The OLT receives OMCI messages from the ONT, and translates them to YANG responses which are provided to the server.

The use of the OMCI messaging for minor changes that require a relatively small amount of data has limited impact on the computational resources of the OLT, such as setting up connections and requesting the status. The OMCI messaging is based upon each message that is 53 bytes in length with a data payload of 31 bytes. Thus, to set up connecting and request status may take a couple hundred requests, at most. Requesting a couple hundred requests does not tend to substantially impact the computational resources of the OLT if performed for one, or a limited number of, ONTs at a time.

The OMCI messaging may be used to provide firmware image updates to a respective ONT so that the firmware of the ONT can be updated. The firmware is relatively large in size as compared to sending control or management messages. Thus, to download an updated firmware image may take eighty-thousand or more OMCI messages. With a relatively complex set of processing for the gRPC protocol conversion process, the OLT is required to consume a substantial amount of its computational resources to perform the protocol conversions and OMCI messaging for such a large number of messages. By way of example, it may take 3-7 minutes or more to perform the gRPC protocol conversions and transfer the updated firmware image to the ONT using the OMCI messaging.

An OLT may provide services to a few thousand (e.g., 2,000+) ONTs that are accessed through an optical distribution network. Often, most if not all of the ONTs, will need to be updated if a firmware update is released. The OLT typically only has the computational resources to perform the processing needed for providing updated firmware for a single ONT at a time, which may take 7 minutes. With an exemplary count of 2,000 ONTs to update at 7 minutes per firmware update, it will take the OLT 14,000 minutes to compete the firmware updates (i.e., ~233 hours, ~9.75 days). However, if the service window during which updates are performed is 3 hours a day, then it will take approximately 78 days to compete the firmware updates, which is an especially long time. Further, OMCI messaging is point-to-point traffic where the data (e.g., firmware image) is designated for a single ONT, so accordingly there is no opportunity to transmit the same firmware upgrade simultaneously to a plurality of ONTs for being updated thereon.

After further consideration it was determined that using the OMCI (optical network unit management and control interface) protocol messages that are carried over ONT Management and Control Channel (OMCC) which were specifically designed for control and management of ONTs is preferably not used for updating the firmware image of the ONT. Rather, an extended OMCC (optical network unit management and control channel) should be used which is based upon an Internet Packet sized data packet of approximately 1980 bytes of payload data plus limited overhead signaling for the payload data rather than based upon the OMCI message, which reduces the overhead signaling. Further, by using the extended OMCC channel the OLT does not need to perform the YANG protocol conversion, thus further reducing the computational burden on the OLT. In this manner, the OLT has on a byte by byte basis less computational burden because the extended OMCC does not make use of the OMCI messages that are carried over the OMCC channel. With the reduced signalling and the increased data payload size, the downloading the firmware image is substantially faster.

Figure 6:
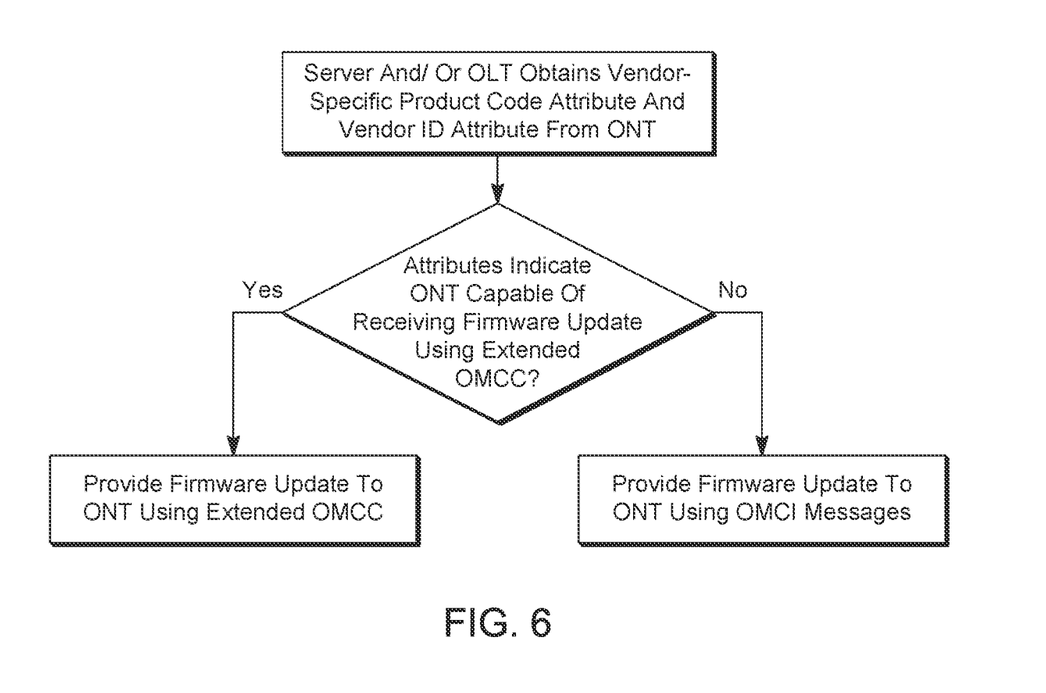
FIG. 6 illustrates an exemplary technique of providing a firmware update to an OLT.

Referring to FIG. 6, one technique to determine which manner to provide a firmware update to a particular ONT may be based upon a particular identification of the ONT, namely, based upon its vendor product code attribute that provides a vendor-specific product code for the ONT and a vendor ID attribute that identifies the vendor of the ONT as the four most significant bytes of the ONT serial number. The server and/or OLT may use an OMCI message to obtain the vendor-specific product code attribute and the vendor ID attribute. The attributes may also be stored in a database available for inspection. If the vendor-specific product code attribute and the vendor ID attribute indicates that the ONT is capable of receiving data using the extended OMCC then the firmware update is provided using this technique. If the vendor-specific product code attribute and the vendor ID attribute indicates that the ONT is not capable of receiving data using the extended OMCC then the firmware update is provided using the OMCI messaging. In some cases, the ONT may not expressly indicate that it supports extended OMCC while still supporting such extended OMCC support only for downloaded actions and not uploaded actions, which may be based on the vendor product code information obtained by the OLT or otherwise known to the system.

Figure 7:
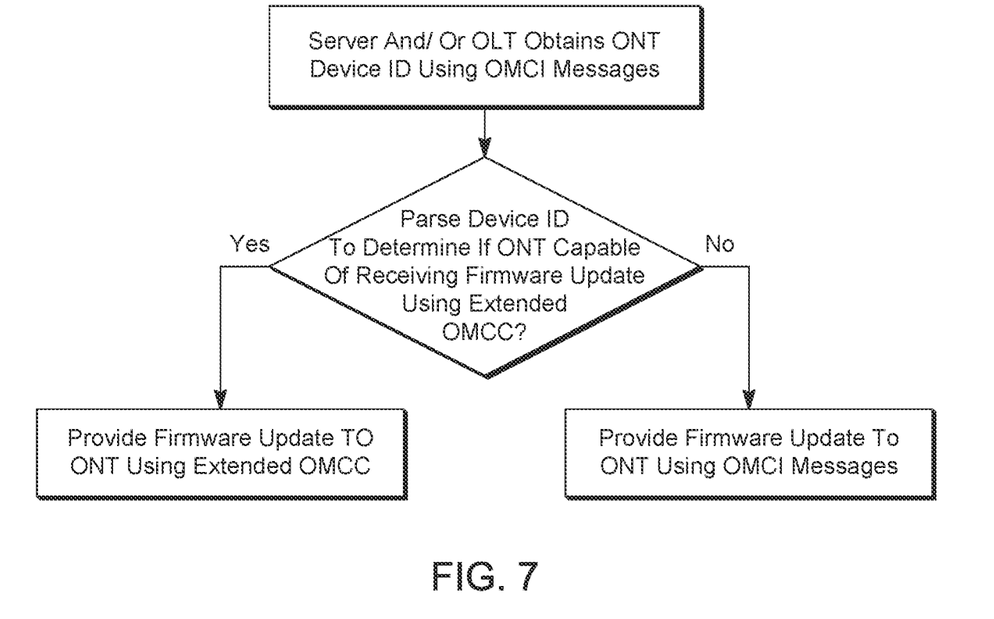
FIG. 7 illustrates another exemplary technique of providing a firmware update to an OLT.

Referring to FIG. 7, another technique to determine in which manner to provide the firmware update is to use the OMCI messaging to query the ONTs device ID to determine if extended OMCC is available. If the device ID indicates that the ONT is capable of receiving data using the extended OMCC then the firmware update is provided using this technique. Otherwise, then the firmware update is provided using the OMCI messaging.

Figure 8:
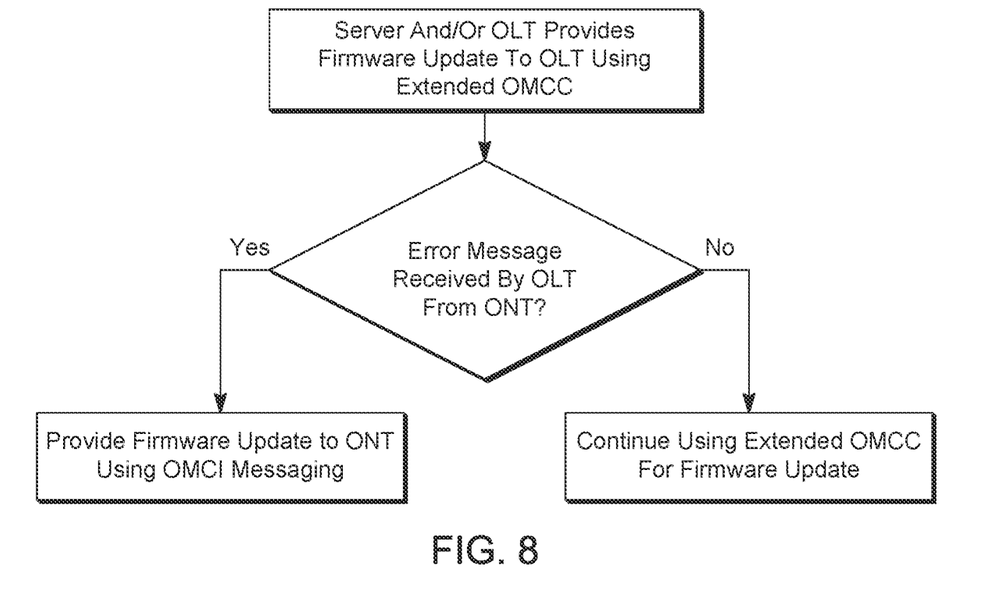
FIG. 8 illustrates another exemplary technique of providing a firmware update to an OLT.

Referring to FIG. 8, another technique to determine in which manner to provide the firmware update is to initially use the extended OMCC to provide the firmware update to the ONT. If the ONT does not return an error message to the OLT in response, then the extended OMCC is continued to be used until the firmware update is completed to the ONT. However, if the attempted use of the extended OMCC results in an error message from the ONT to the OLT, then the OLT switches to using the OMCI messaging to provide the firmware update to the ONT. In this manner, as a result of an error message, a decision may be made between which technique to provide the firmware image to the ONT.

In many cases, the server creates a firmware image that is to be downloaded to a set of ONTs, then the OLT uses the extended OMCC and/or the OMCI messaging to distribute the firmware image to the ONTs in a sequential manner. However, it was determined that during this process if the firmware image tends to change on a regular basis, and therefore several firmware images are sequentially transferred to the OLT while the OLT is still processing and transmitting an earlier firmware image, then the storage capabilities of the OLT may be insufficient to provide temporary storage for any additional firmware images to be subsequently processed while the previous firmware images are yet to be processed and transmitted to a particular ONT. Accordingly, it is desirable that the server and/or the OLT limits the number of firmware images stored for subsequent processing by the OLT until sufficient storage capacity is available.

Moreover, each functional block or various features in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. A method of providing a firmware update from an optical line terminal to an optical network terminal comprising:
   (a) said optical line terminal receiving data from a server at a north bound interface and sending data to said server at said north bound interface;
   (b) said optical line terminal receiving optical data from said optical network terminal from at least one port from an optical fiber and sending optical data to said optical network terminal to said at least one port through said optical fiber;
   (c) at least one of said server and said optical line terminal inspecting a vendor-specific produce code attribute of said optical line terminal and a vendor ID attribute as a four most significant bytes of a serial number for said optical network terminal to determine whether said optical network terminal is capable of receiving a firmware update using an extended optical network terminal management and control channel which is based upon an Internet Packet and is not based upon an optical network unit management and control interface message;
   (d) based upon said determining alternatively, either, (1) said optical line terminal transmitting said firmware update to said optical network terminal using said extended optical network terminal management and control channel and (2) said optical line terminal transmitting said firmware update to said optical network terminal using optical network unit management and control interface messages based upon said optical line terminal receiving YANG data models that are translated by said optical line terminal to said optical network unit management and control interface messages.

2. The method of claim 1 wherein said at least one of said server and said optical line terminal use an optical network unit management and control interface message to said optical network terminal to obtain said vendor-specific produce code attribute and said vendor ID attribute from said optical network terminal.

3. A method of providing a firmware update from an optical line terminal to an optical network terminal comprising:
   (a) said optical line terminal receiving data from a server at a north bound interface and sending data to said server at said north bound interface;

(b) said optical line terminal receiving optical data from said optical network terminal from at least one port from an optical fiber and sending optical data to said optical network terminal to said at least one port through said optical fiber;

(c) at least one of said server and said optical line terminal inspecting a device ID of said optical network terminal to determine whether said optical network terminal is capable of receiving a firmware update using an extended optical network terminal management and control channel which is based upon an Internet Packet and is not based upon an optical network unit management and control interface message;

(d) based upon said determining alternatively, either, (1) said optical line terminal transmitting said firmware update to said optical network terminal using said extended optical network terminal management and control channel and (2) said optical line terminal transmitting said firmware update to said optical network terminal using optical network unit management and control interface messages based upon said optical line terminal receiving YANG data models that are translated by said optical line terminal to said optical network unit management and control interface messages.

4. The method of claim 3 wherein said at least one of said server and said optical line terminal use an optical network unit management and control interface message to said optical network terminal to obtain said device ID of said optical network terminal.

5. A method of providing a firmware update from an optical line terminal to an optical network terminal comprising:

(a) said optical line terminal receiving data from a server at a north bound interface and sending data to said server at said north bound interface;

(b) said optical line terminal receiving optical data from said optical network terminal from at least one port from an optical fiber and sending optical data to said optical network terminal to said at least one port through said optical fiber;

(c) said optical line terminal transmitting a firmware update to said optical network terminal using an extended optical network terminal management and control channel which is based upon an Internet Packet and is not based upon an optical network unit management and control interface message, and in response to receiving an error as a result of said using said extended optical network terminal management and control channel transmitting said firmware update to said optical network terminal, said optical line terminal transmitting said firmware update to said optical network terminal using optical network unit management and control interface messages based upon said optical line terminal receiving YANG data models that are translated by said optical line terminal to said optical network unit management and control interface messages.

6. A method of operating an optical system comprising:

(a) an optical line terminal receiving data from a server at a north bound interface and sending data to said server at said north bound interface;

(b) said optical line terminal receiving optical data from said optical network terminal from at least one port from an optical fiber and sending optical data to said optical network terminal to said at least one port through said optical fiber;

(c) said optical line terminal receiving a YANG request from said server, and in response, translating said YANG request to said optical network terminal using optical network unit management and control interface messages;

(d) said server includes identified attributes of said optical network terminal, where said identified attributes includes at least one of (1) a device ID of said optical network terminal, (2) a vendor-specific product code attribute of said optical network terminal, and (3) a vendor ID attribute of said optical network terminal, said server builds said YANG request that is provided to said optical line terminal in a manner that is modified based upon said identified attributes of said optical network terminal such that YANG request is different based upon different said at least one of (1) said device ID of said optical network terminal, (2) said vendor-specific product code attribute of said optical network terminal, and (3) said vendor ID attribute of said optical network terminal.

\* \* \* \* \*